Oct. 20, 1936.  A. L. COLLINS  2,057,767
DIFFERENTIAL PRESSURE SYSTEM FOR PIPE FLOWS
Filed Sept. 29, 1934
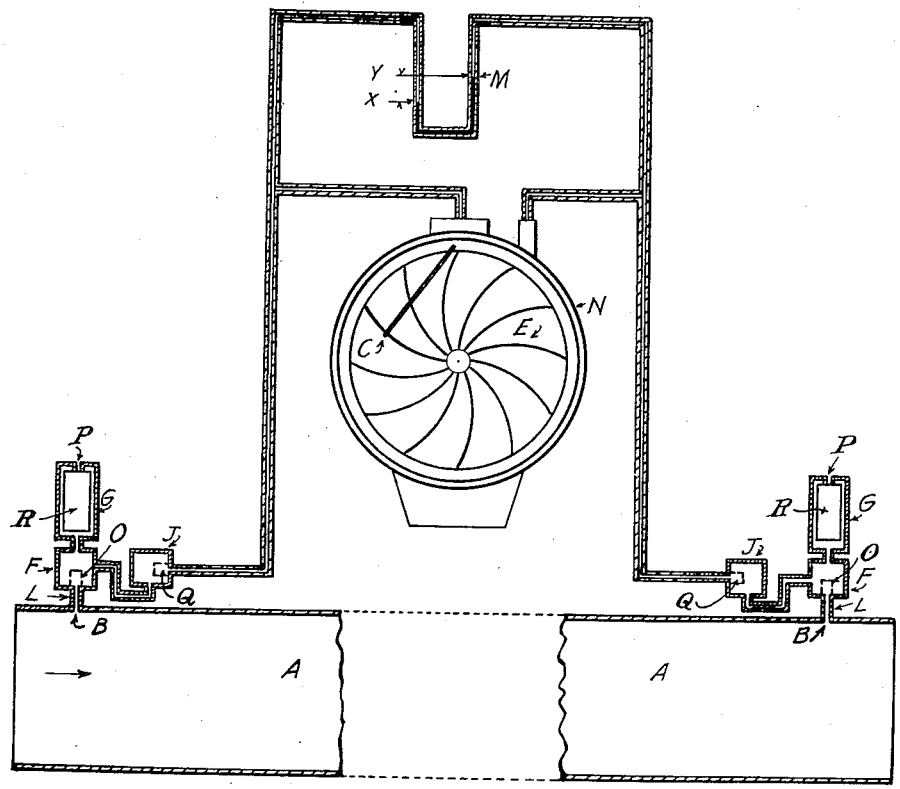
WITNESSES
INVENTOR Patented Oct. 20, 1936

2,057,767

UNITED STATES PATENT OFFICE 2,057,767

DIFFERENTIAL PRESSURE SYSTEM FOR PIPE-FLOWS

Arthur Lee Collins, Berkeley, Calif.

Application September 29, 1934, Serial No. 746,092

1 Claim. (Cl. 73—205)

This invention relates to the measuring of a stream flow in a pipe which is transporting solids.

In the operation of pipe lines which are used for the transportation of a mixture of water and solids, for example, as practiced by the pipe line dredge operator, it is desirable to know at all times the velocity of the stream and to some extent, the amount of solids passing a given station. Without this information as a guide, the amount of solids may become so concentrated that they will, by force of gravity, drag along the bottom of the pipe in such a manner as to cause excessive wear in the pipe, and a low output of solids. In addition, a stream, when greatly burdened with solids, may at any time, due to a slight change in conditions, plug the line with solid material, thus stopping the operations.

I have invented a system of measurement by which the velocity of the water in the line is indicated when water alone is passing the rating station. This condition I have called the first stage. As the solids are added to the stream the increase in the specific gravity of the liquid is indicated by a further increase in the differential pressure, which is the second stage. As the percentage of solids is allowed to increase indefinitely or certain classes of solids have been added, such as clay, for example, it has been discovered that a critical condition is finally reached when the differential pressure is greatly increased, and this is called the third stage. During this stage, which is distinctly different from the other stages, the water is channeling principally along the top of the pipe, and permitting the solids to concentrate in the lower part of the pipe.

So-called frictional resistance is observed in all pipe flows. By observing this resistance when it originates between up-stream and down-stream connections, which are situated a distance apart on the pipe, there is offered a means whereby the velocity, the relative specific gravity and loaded condition of the stream, as covered by the three stages mentioned above, can be observed so that the operator can determine the proper mixture of water and solids, and regulate the stream velocity as conditions demand.

Manometers for the measurement of differential pressures, both indicating and chart recording, mercury and U tube, and diaphragm type, also water-air type, local and distant recording, are now in common use in connection with venturi and orifice plate meters. The same manometers can now be attached to sections of pipe free from orifice plate or other similar partial obstructions, and will indicate the frictional resistance resulting from the roughness of the pipe surface and the natural turbulence of the stream. Ordinarily the manometer can be calibrated to indicate the water velocity in the line when the specific gravity of the liquid is maintained constant, as when water alone is flowing. The increase in specific gravity of the liquid when the solids are added is indicated to a certain extent by the increase in the manometer readings. The third, or critical stage, as indicated on the manometer, may be several times the differential of the first and second stages. Obviously, at this stage it is advisable for the operator to alter the percentage of solids and water, or to alter the velocity of the liquid, if it is desired to change this condition.

In the pipe line flow from a dredge, where velocities of from 10 to 30 feet per second are encountered, it is found that when connections are spaced from 20 to 100 feet apart on a pipe, the differential pressure obtained therefrom is sufficient to operate the commercial type of manometer. Obviously, shorter or longer sections of pipe can be used as a control station, and satisfactory results obtained, depending upon the range of the manometer. The most satisfactory information is obtained by recording the differential pressures on a chart, the chart being advanced by a clock movement. However, a simple mercury U manometer can be used to furnish valuable information.

It has also been further concluded that the pressure connections are most suitable when made on the top of a horizontal pipe. By leading the pressure-transmitting connections vertically above the pipe, the connections will remain free from permanent obstructions when attached to the manometer, and will not freeze up with the solids. Suitable settling chambers and strainers are desirable to prevent the manometer from accumulating sediment. Air vents are advisable to remove air when it gets into the various chambers and connections.

When the system is in practical operation a graphical chart record of the differential pressure will show at various times a value which can be interpreted as the first stage from which the stream velocity can be determined. A second stage, which is the result of adding a limited amount of solids to the stream, is identified by an increase in the differential pressure somewhat in proportion to the increase of the specific gravity of the stream. A third, or what may be considered the critical stage, is indicated by differential pressure greatly exceeding that of the previous stages. This critical stage begins rather abruptly, and the pressure has little or no relation to the previous stages, since it represents a stream overburdened with solids, wherein a body of water, comparatively free of the larger solids, is passing rapidly above the concentrated body of solids which are moving along the bottom of the pipe. The figure on the drawing shows a cross-sectional elevation of my invention.

In the accompanying drawing there is shown a plain section of pipe which is a portion of a discharge conduit, used in connection with hydraulic dredge operations and through which the solids are transported. To this section of pipe are attached the manometers and connections with the operative means necessary to keep the differential pressure system in continuous and practical operation, and to provide information desired by the operator.

In operation the water conveying the solids flows in the main conduit. When first put in operation a small amount of liquid from the main conduit enters the surge tube L. The larger solids are prevented from entering the surge chamber F by the strainer medium O. Thence the strained liquid fills the settling chamber J where it is again strained by a strainer medium Q and fills the small conduit leading to the manometer.

The loss of head between B and B connections, which are designated as up-stream and down-stream connections, due to the resistance offered to the flow in the pipe, is indicated on the manometer.

The flow in the main conduit generally carries a small amount of entrained air, a portion of which finds its way into the chamber F. If air completely fills this chamber, the differential pressure will not be properly recorded, due to the unbalancing of the continuous pressure transmitting water columns leading to the manometer. When air enters the chamber F it finds its way into G and permits the lighter than water float R to drop, unseating the opening at P. The release of the air permits the water to rise with the float until the chamber is again sealed.

The differential pressure system is now further described:

B and B are up-stream and down-stream pressure connections to a pipe-line A. The equipment through which the pressures are transmitted to the manometers M and N is practically the same for both connections. It consists of first, the suspension tube L, then the surge chamber F, with strainer O, then the settling chamber J, with strainer Q, and the manometers. Air relief valve G is imposed on the chamber F. The differential pressure manometer N is shown with chronologically operated and recording chart E and pen C. In the mercury U tube M, the different in the mercury column X and Y is the differential pressure.

I claim:

In measuring apparatus for liquids containing solids flowing in a conduit, the combination of spaced connections communicating with said conduit at spaced points at which the pressures are different due to the friction of flow, a differential pressure manometer, means for transmitting pressures from said connections to said manometer, said means comprising a vertically disposed surge tube, a filtering medium, a surge chamber communicating with said tube through said filtering medium, a float operated air relief valve surmounting said surge chamber to permit escape of air, a settling chamber communicating with said surge chamber, means for transmitting the pressure in said settling chamber to said manometer, a strainer medium in said settling chamber, said manometer being adapted to indicate the drop of pressure between said connections.

ARTHUR LEE COLLINS.